United States Patent
Tomassoni

(10) Patent No.: US 7,063,205 B2
(45) Date of Patent: Jun. 20, 2006

(54) RECIPROCATING CONVEYOR WITH LIQUID COLLECTING TRAY

(75) Inventor: Gabe Tomassoni, Huntsville (CA)

(73) Assignee: Fanotech Enviro Inc., Huntsville (CA)

( * ) Notice: Subject to any disclaimer, the term of this patent is extended or adjusted under 35 U.S.C. 154(b) by 0 days.

(21) Appl. No.: 11/000,831

(22) Filed: Dec. 1, 2004

(65) Prior Publication Data
US 2005/0118008 A1   Jun. 2, 2005

(30) Foreign Application Priority Data
Dec. 2, 2003   (CA) .................................. 2451809

(51) Int. Cl.
B65G 25/04   (2006.01)
(52) U.S. Cl. .............................. 198/750.3; 198/750.2; 414/525.9
(58) Field of Classification Search ............. 414/525.1, 414/525.9; 198/750.1, 750.2, 750.3, 750.5, 198/750.7
See application file for complete search history.

(56) References Cited

U.S. PATENT DOCUMENTS

| | | | |
|---|---|---|---|
| 4,143,760 A | 3/1979 | Hallstrom | |
| 4,184,587 A | 1/1980 | Hallstrom | |
| 4,691,819 A | 9/1987 | Hallstrom | |
| 4,709,805 A | 12/1987 | Foster | |
| 5,088,595 A | 2/1992 | Hallstrom, Jr. | |
| 5,145,309 A * | 9/1992 | Foster | 414/525.1 |
| 5,165,525 A | 11/1992 | Quaeck | |
| 5,222,590 A | 6/1993 | Quaeck | |
| 5,234,309 A * | 8/1993 | Foster | 414/525.9 |
| 5,267,641 A | 12/1993 | Hallstrom, Jr. | |
| 5,390,781 A | 2/1995 | Foster | |
| 5,402,878 A * | 4/1995 | Lutz | 198/750.6 |
| RE35,156 E | 2/1996 | Hallstrom, Jr. | |
| 5,522,494 A * | 6/1996 | Lutz | 198/750.3 |
| 5,547,067 A | 8/1996 | Foster | |
| 5,588,522 A | 12/1996 | Foster et al. | |
| 5,934,445 A | 8/1999 | Foster et al. | |
| 5,957,267 A | 9/1999 | Quaeck et al. | |
| 6,013,585 A | 1/2000 | Foster et al. | |
| 6,439,375 B1 | 8/2002 | Foster et al. | |

OTHER PUBLICATIONS

HALLCO Manufacturing Co. Inc., Tillamook, Oregon, Product Literature, "TF4500 Genie Live Floor Installation Guide".

Universal Handling Equipment Company, Owosso, Michigan, Product Literature, "UWF 48-120 LW Walking Floor Transfer Trailer".

Peerless Corporation, Paragould, Arkansas, Product Literature, "The Ultimate Peerless Live Floor Refuse Transport".

(Continued)

*Primary Examiner*—James R. Bidwell
(74) *Attorney, Agent, or Firm*—D. Peter Hochberg; Sean Mellino; Katherine R. Vieyra

(57) ABSTRACT

A system for carrying refuse and other materials can be used in combination with a transport vehicle. More particularly, the system can be part of a trailer for a transport vehicle. The system has a frame to which a load-bearing platform is attached. The platform has a plurality of elongated slats, each of which is engaged with a slat bearing bar such that the slats are spaced so as to permit liquid to seep between them. A drive mechanism is attached to the slats for displacing them. A tray is attached to the frame and extends beneath the elongated slats so as to catch liquid waste that seeps between the slats.

25 Claims, 7 Drawing Sheets

OTHER PUBLICATIONS

Ravens Metal Products, Inc., Kent, Ohio, Product Literature, "Live Floor Trailer From Ravens".

East Manufacturing Corp., Randolph, Ohio, Product Literature, "The East Unloader".

McLain Group, Sterling Heights, Michigan, Product Literature, "Transfer Trailers McClain E-Z Pack".

Red River Manufacturing, Inc., West Fargo, North Dakota, Product Literature, "Live-Bottom 8 Axle Trailers Building a Better Bottom Line".

Keith Manufacturing Company, Madras, Oregon, Product Literature, "Discover the Many Advantages of Keith Walking Floor Unloading Systems".

Fabrex Steel Inc, Trois-Rivières, Québec, Canada, Product Literature, "Super Heavy Duty Trash Transfer Trailer".

Spector Manufacturing Inc., St. Clair, Pennsylvania, Product Literature, "Steel Moving Floor Trailer".

Somerset Welding and Steel, Inc., Somerset, Pennsylvania, Product Literature, "Live Floor Transfer Trailers".

HALLCO Manufacturing Company, Inc., Tillamook, Oregon, Product Literature, "The "Genie" Leakproof Floor System".

HALLCO Mfg. Co., Inc., Tillamook, Oregon, Product Literature, "Hallco Live Floor Conveyor Systems 4000 Series".

Wilkens Walking Floor Trailers, Morris, Minnesota, Product Literature, "Load Runner "Payload Plus" Aluminum Composite Open Top Transfer Trailers".

HALLCO Corp, Tillamook, Oregon, Product Literature, "Hallco Live Floors Conveyor Systems".

STECO, Inc., Enid, Oklahoma, Product Literature, "Steco Product Guide Transfer Trailers".

KEITH Mfg. Co., Madras, Oregon, Product Literature, "Keith Walking Floor Material Handling Technology".

HALLCO Manufacturing Company, Inc., Tillamook, Oregon, Product Literature, "How Can We Move Your World?".

* cited by examiner

RECIPROCATING CONVEYOR WITH LIQUID COLLECTING TRAY

FIELD OF THE INVENTION

The present invention relates to transportation trailers for carrying refuse and other materials.

BACKGROUND OF THE INVENTION

Reciprocating slat-type conveyors are well known in the art. This type of conveyor system provides a convenient method of discharging refuse (or other loads) rearwardly from a trailer without tilting the trailer. The system typically includes a plurality of slats, independently driven with three or more drive means in a forward and rearward direction such that at any given moment either all slats or every third slat is in movement. Thus, a relatively short reciprocating movement will displace over time the entire load out of the trailer in a stepwise movement. Examples of such conveyors are disclosed in U.S. Pat. No. 4,143,760 (Hallstrom), U.S. Pat. No. 4,184,587 (Hallstrom), U.S. Pat. No. 4,691,819 (Hallstrom), U.S. Pat. No. 4,709,805 (Foster) and U.S. Pat. No. 5,934,445 (Foster et al.).

When the loads transported on a trailer or by a vehicle contain a liquid component, liquid may seep onto conveyor slats, between conveyor slats onto the drive means and out of the trailer or vehicle onto the road. This is especially problematic when the load is refuse such that the liquid may be toxic and its escape from the trailer or vehicle contravenes environmental regulations. Various improvements have been disclosed in response to the seepage of toxic liquids from the load. U.S. Pat. No. 6,013,585 (Foster et al.) describes a method for manufacturing conveyor slats that are chemical resistant and non-corrosive. Each of U.S. Pat. No. 5,165,525 (Quaeck), U.S. Pat. No. 5,267,641 (Hallstrom, Jr.) and U.S. Pat. No. 5,547,067 (Foster) disclose base members to which the conveyor slats are attached. The base members may be attached, configured or sealed in such a manner so as to prevent the leakage of liquid beneath them. U.S. Pat. Nos. 5,088,595 and RE35,156 each disclose a liquid receptacle that collects liquid. The liquid receptacle extends beneath a portion of each base member.

Reciprocating conveyors may be attached to frameless trailers, as described in U.S. Pat. No. 5,957,267 (Quaeck et al.). Frameless trailers minimize the total mass of the load by eliminating components of the conventional framework assembly that normally supports the load. One drawback associated with the use of a frameless trailer is the damage sustained by the piston rods, which are components of the drive means, when loads are dropped on the conveyor slats above the piston rods. U.S. Pat. No. 5,957,267 adds fixtures to the drive means assembly, which fixtures bear the loads that are dropped upon the conveyor slats.

A further limitation that has been identified in prior art reciprocating conveyors is the position of the drive means. When such reciprocating conveyors are not fitted with base members, liquid waste seeps onto the drive means located beneath the conveyor slats, thus hampering movement of the conveyor slats. In liquid impermeable conveyor systems, it is expensive and labour intensive to mount a drive means below the conveyor slats. This is because an extensive hose and tubing system is necessary to connect the hydraulic fluid supply that is frequently a component of such drive means to drive units such as pistons. Thus U.S. Pat. No. 5,222,590 (Quaeck) discloses a configuration in which the drive means is positioned outside of the container in which the load is transported.

There are a number of limitations associated with prior art reciprocating conveyors, including improved reciprocating conveyors adapted to transport loads having a liquid component. Adding seals to each base member increases the costs of manufacture. Using base members to prevent the leakage of liquid beneath them is undesirable because such base members are susceptible to damage from the impact that they sustain when loads are dropped upon them. Replacing such base members is more costly and time-consuming when they are sealed. Furthermore, changing the configuration of the slats when they have a complicated base member structure, whether or not such structure includes seals, is also costly and time-consuming. Moreover, such seals trap moisture amongst the base member structure, thus making it susceptible to damage from the freezing of such moisture in cold temperatures. Finally, previous means for preventing leakage through the conveyor could not be attached to the conveyors of more than one manufacturer, since the width of the conveyor slats varies depending on who manufactures them.

There are other drawbacks to the prior art liquid collection receptacles. The receptacle is small and must be emptied periodically, since failure to empty the receptacle will result in the drive means for the conveyor becoming submerged in liquid waste. Furthermore, the dual trays and centre trough orientation of the liquid receptacle necessitates the welding of the components of the receptacle such that each weld must be covered with sealant to prevent leakage, thus adding to the cost of manufacturing the receptacle. Moreover, the prior art receptacle is fastened to cross members by rivets or bolts. Each fastening means must be individually sealed. When a reciprocating conveyor is used with the prior art receptacle, debris accumulates between the conveyor slats and pan, which necessitates frequent cleaning and repair.

There is disclosed herein a refuse collection system with a reciprocating conveyor for use with a transport vehicle, this system having little or no leakage of liquid waste.

Accordingly, one aspect of the invention herein comprises a refuse collection system for use in combination with a transport vehicle. The system includes a refuse container for the vehicle, this container having a length and including two lengthwise extending sidewalls, a front wall, a rear door and a bottom. The bottom includes a frame having at least two cross members and at least two slat-bearing bars extending across and mounted on the cross members. A platform is attached to and mounted on the frame and has at least two elongated slats, each engaged with one of the at least two slat-bearing bars. The at least two elongated slats are spaced apart from one another so as to permit liquid refuse to seep between and through the slats. A drive means is attached to the at least two elongated slats and situated distal from the platform out of the path of the liquid refuse. The drive means moves the slats between a first and a second position in a lengthwise direction relative to the slats. The system also has an elongate tray extending in a lengthwise direction relative to the container, attached to the frame, and situated beneath the platform and the at least two slat bearing bars so as to catch the liquid refuse that seeps between and through the at least two slats.

According to another aspect of the invention, a transport trailer comprises a trailer unit for a transport vehicle, this trailer unit including a transport container having a length and including two lengthwise-extending sidewalls, a front wall, a rear door and a bottom. The bottom is formed by a frame constructed of cross-members and slat-mounting bars extending across and mounted on the cross-members. A plurality of elongate slats extend lengthwise in the trailer unit and are mounted on the slat mounting bars for lengthwise reciprocation. Adjacent slats are spaced-apart from one another so as to permit liquid to seep between and through the slats and the slat-mounting bars. A drive mechanism is attached to the slats for reciprocating them between first and second positions, this drive mechanism being mounted on the trailer unit. An elongate tray extends in a lengthwise direction relative to the container, is attached to the frame, and is situated beneath the slats and the frame. This tray is adapted to catch the liquid that seeps between and through the slats and the slat-mounting bars.

According to a further aspect of the invention, a transport vehicle comprises a wheeled vehicle unit including a transport container having a length, two lengthwise-extending sidewalls, a front wall, a rear door, and a bottom. The bottom is constructed with transversely extending frame members and is adapted to support a reciprocating slat-type conveyor mounted on top of the frame members during use of the vehicle. An elongate tray extends in a lengthwise direction relative to the container, is attached to the bottom beneath the frame members, and is adapted to catch liquid from the contents of the container that can seep through the conveyor and between the frame members during use of the vehicle with the slat-type conveyor. The tray extends beneath most of the length of the transport container.

Directional references herein such as "vertical" and "horizontal" are for convenience of description only. It will be appreciated by one skilled in the art that (a) the invention may be tilted, and (b) even when placed on the level, a moderate departure from the horizontal, vertical etc. is permissible. Further, terms such as "wall" are intended to have a broad meaning to include a member in any orientation which serves the function of such member.

BRIEF DESCRIPTION OF THE DRAWINGS

In drawings which illustrate by way of example only a preferred embodiment of the invention.

DETAILED DESCRIPTION OF THE PREFERRED EMBODIMENTS

Figure 1:
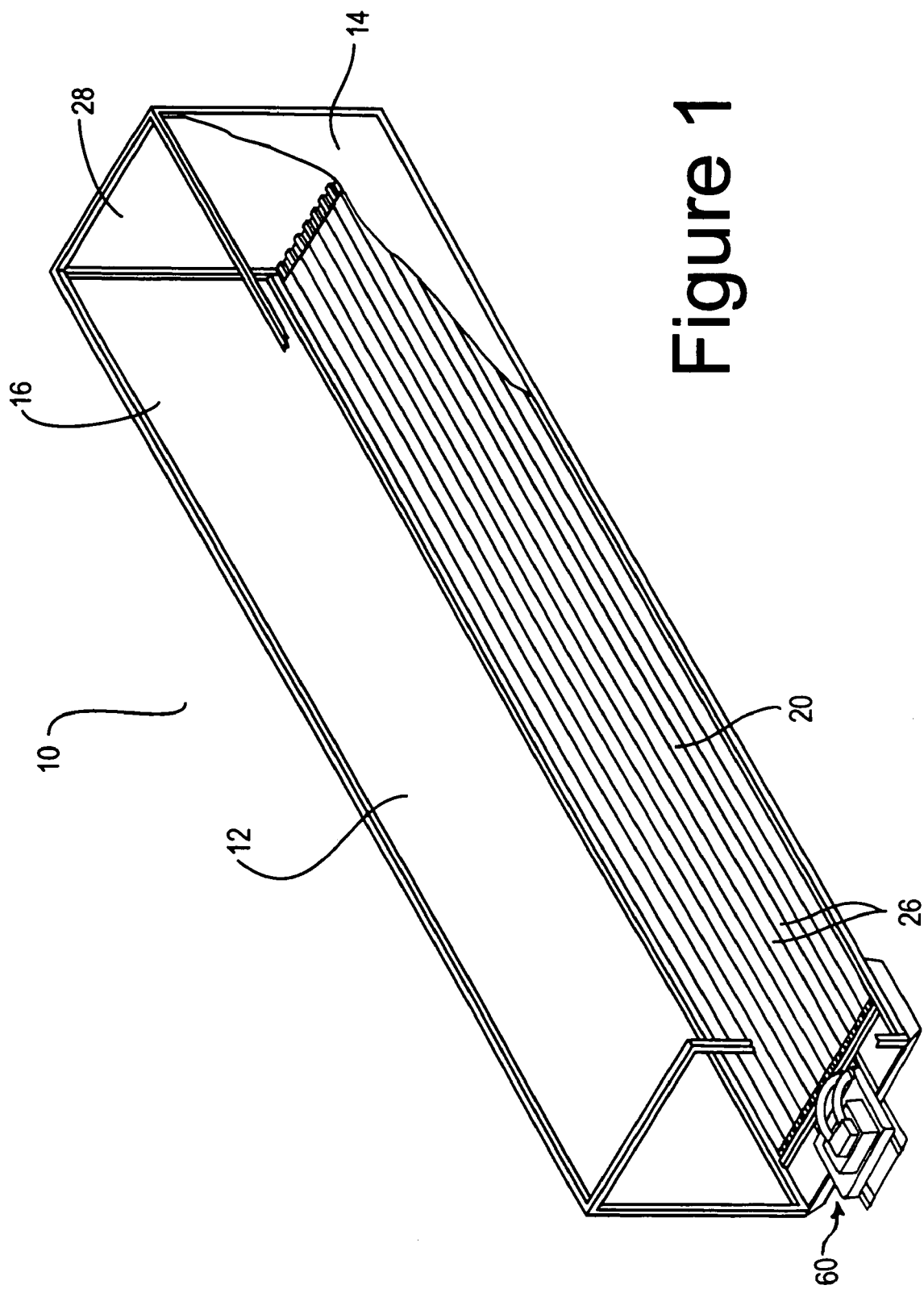
FIG. 1 is a perspective view of a trailer with a liquid collecting tray in which the housing of the trailer has been cut away so as to show the inside of the trailer.
Figure 2:
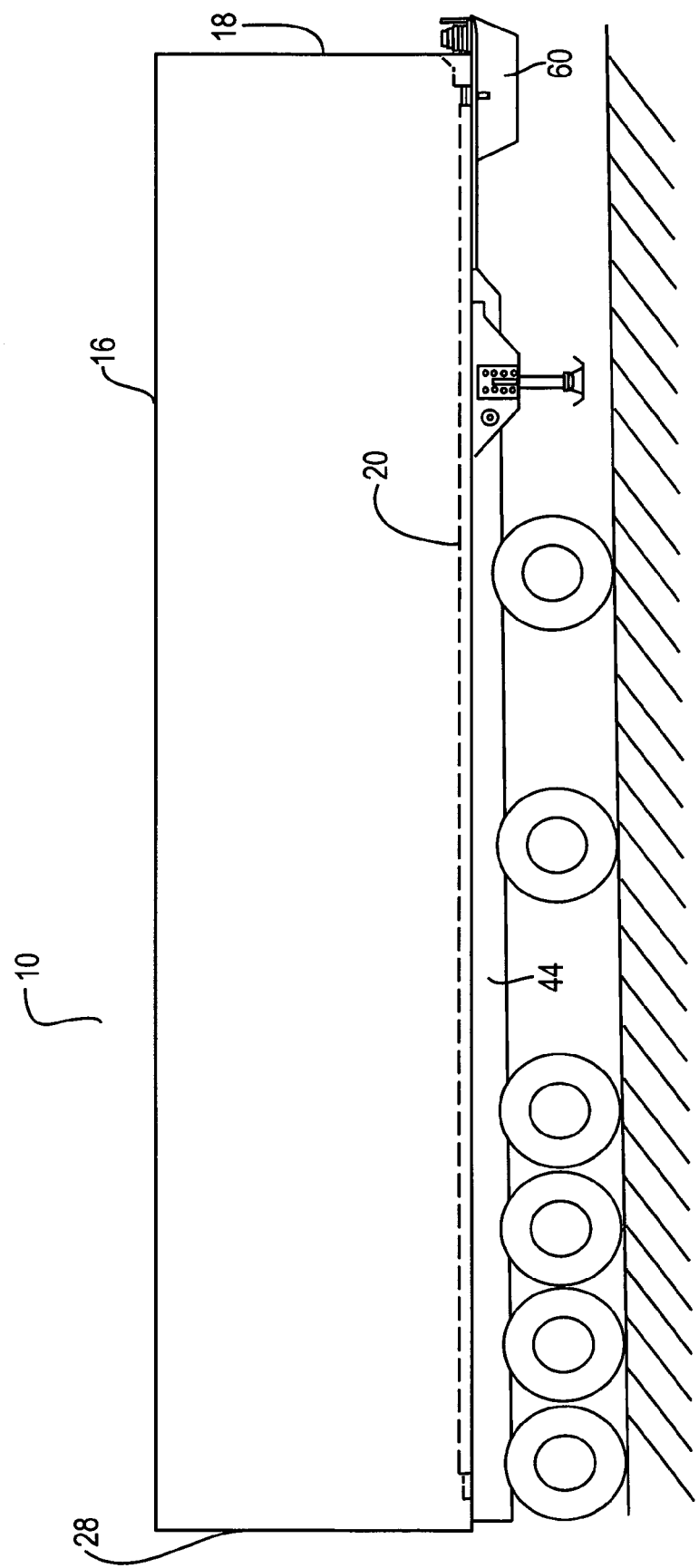
FIG. 2 is a side view of the trailer.

A trailer 10 for collecting and transporting refuse is shown in FIGS. 1 and 2. The trailer is in general terms a conventional wheeled trailer for engagement to a tractor. The trailer 10 has side walls 12 and 14, a top wall 16 and a front wall 18. The trailer 10 also has a load-bearing platform 20 comprised of elongated slats 26. Elongated slats 26 extend lengthwise within the trailer for reciprocal movement between a first position and a second position in the fore/aft direction within the trailer. A rear door 28 encloses contents within the trailer 10. Optionally, the trailer is open-topped.

Figure 3:
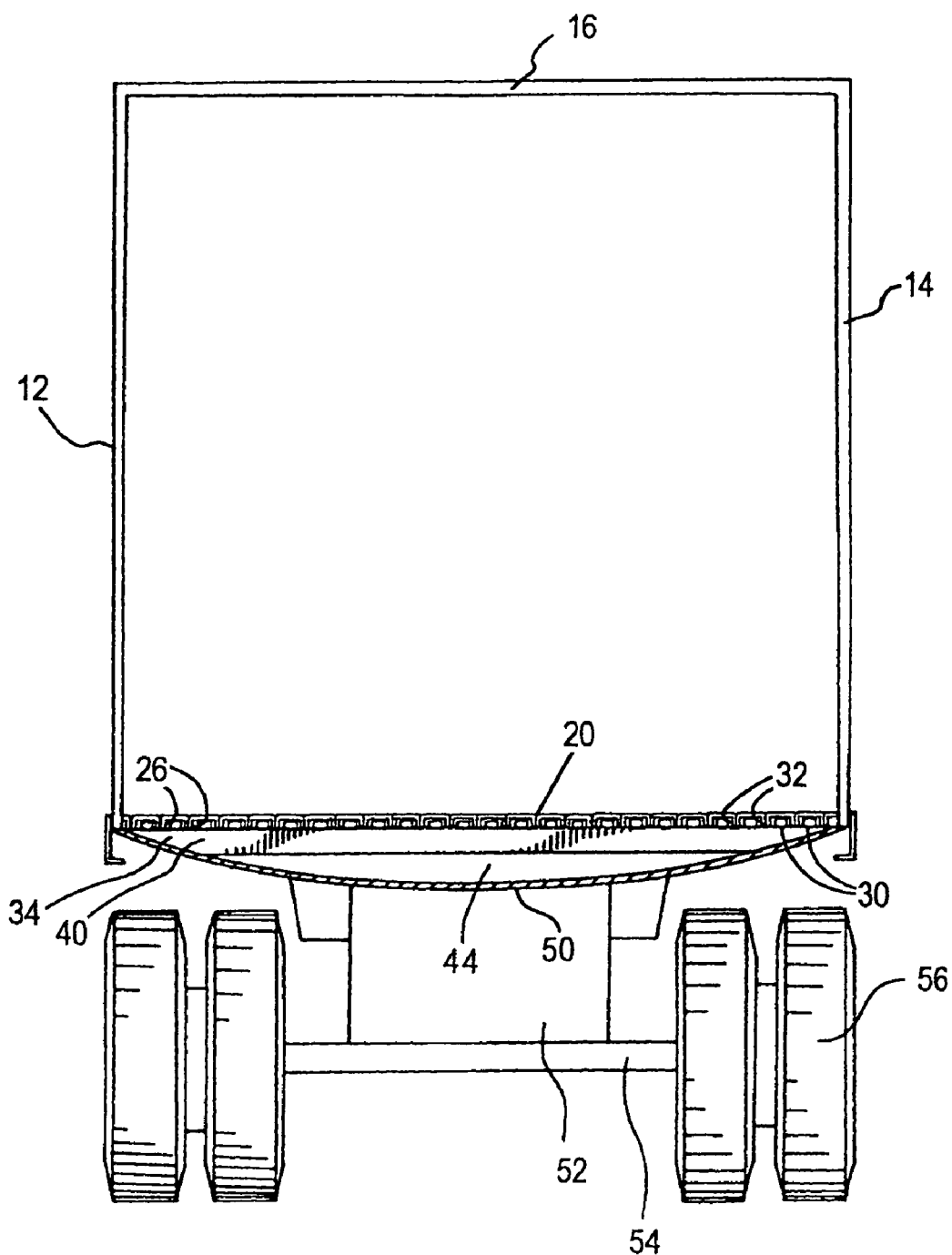
FIG. 3 is a rear view of the trailer without a rear door.
Figure 4:
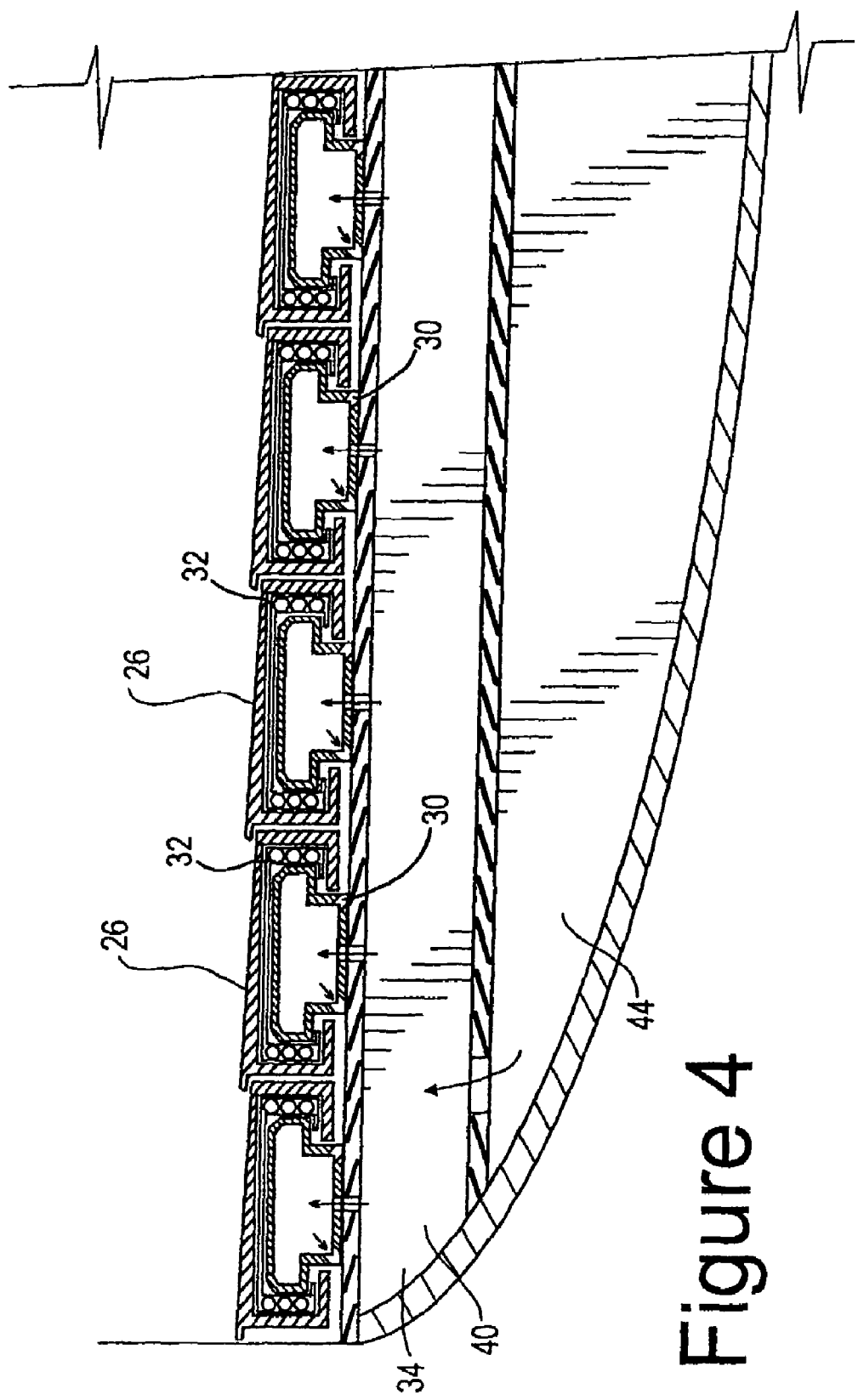
FIG. 4 is a rear view of a portion of the trailer without a rear door.

As seen in FIGS. 3 and 4, each slat 26 is engaged to a slat-bearing bar 30. Each slat-bearing bar 30 has a bearing 32 clipped to the slat-bearing bar 30 and the slat 26 engages and slides upon the bearing 32. The elongated slats 26 are set upon the slat-bearing bars 30 such that there is a space between the adjacent slats 26. This space is wide enough for liquid to seep through. Preferably the space is 1/32 of an inch but may have a width of between 1/64 of an inch and three inches. Preferably the space is of a size so as to prevent solid waste from falling between the slats 26.

The slat-bearing bars 30 are attached to at least two cross members 34 such that the slat-bearing bars 30 and the cross members 34 form a frame 40. The slat-bearing bars 30 are attached generally perpendicularly to the cross members 34. According to one version of the system, the cross members 34 and the slat-bearing bars 30 are hollow. The bars 30, which can also be described as slat-mounting bars, are spaced apart from each other and are mounted directly to the cross members 34.

The cross members 34 are attached to an extended or elongate tray 44. The extended tray 44 is situated beneath the platform 20. In a one embodiment of the trailer, the elongate tray 44 extends beneath the platform 20 along most of the length of the platform and beneath the bars 30, as shown in FIGS. 2 to 4. The tray 44 attaches to the cross members 34 near the side wall 12 and the side wall 14. Though the elongate tray 44 may have any shape, it is preferred that it be arcuate in transverse cross-section. The extended tray 44 is convex-shaped in cross-section with the convex curve facing downwards. In one version of the system, the extended tray 44 is also progressively sloped, either downward or upward, from the end of the extended tray 44 proximate to the front wall 18 to the end of the extended tray 44 proximate to the rear door 28. The elongate tray 44 is preferably sealed.

The extended tray 44 forms a structural component of the trailer 10 since the tray 44 supports the frame 40. It is preferred that the tray 44 be a single integral component. However, the tray 44 may comprise multiple sections fastened together and sealed.

The extended tray 44 has a bottom surface 50 which attaches to chassis 52. The chassis 52 is attached to axles 54. Each axle 54 is attached to wheels 56 in a conventional manner.

Figure 7:
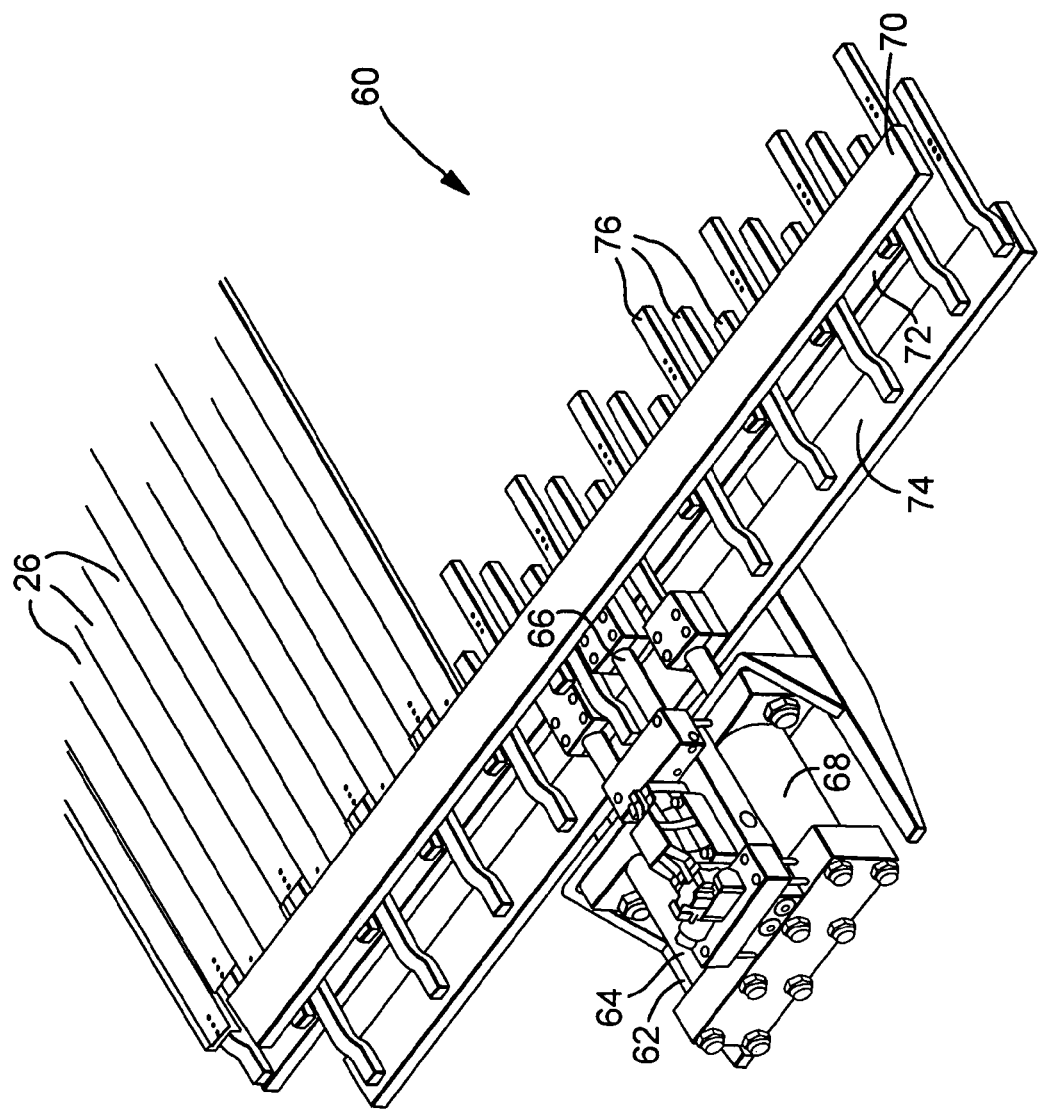
FIG. 7 is a perspective view of a portion of the trailer showing the drive means for moving the floor of the trailer and the attachment of the drive means to some of the elongated slats.

Referring to FIG. 7, the trailer 10 also has a drive means 60 for displacing the elongated slats 26 in the fore/aft direction. One component of the drive means 60 is a hydraulic press portion 62. The hydraulic press portion 62 is situated outside of the trailer 10 and out of the path of the liquid refuse falling between the elongated slats 26 to the extended tray 44. The hydraulic press portion 62 has three hydraulic cylinder drives 64, 66 and 68, each of which extend through an opening (not shown) in the front wall 18 into the trailer 10. Each of the hydraulic cylinder drives 64, 66 and 68 are attached to one of three cross drives 70, 72 and 74. Each of the cross drives 70, 72 and 74 have fingers 76. The fingers 76 of each cross drive are attached to every third elongated slat 26 in the series of elongated slats such that each elongated slat is attached to a single cross drive. Preferably, fingers 76 are bolted to the elongated slats 26.

It will be understood by a person skilled in the art that the drive means 60 may have any number of hydraulic cylinders greater than one and that the number of cross drives is equal to the number of hydraulic cylinders.

Figure 5:
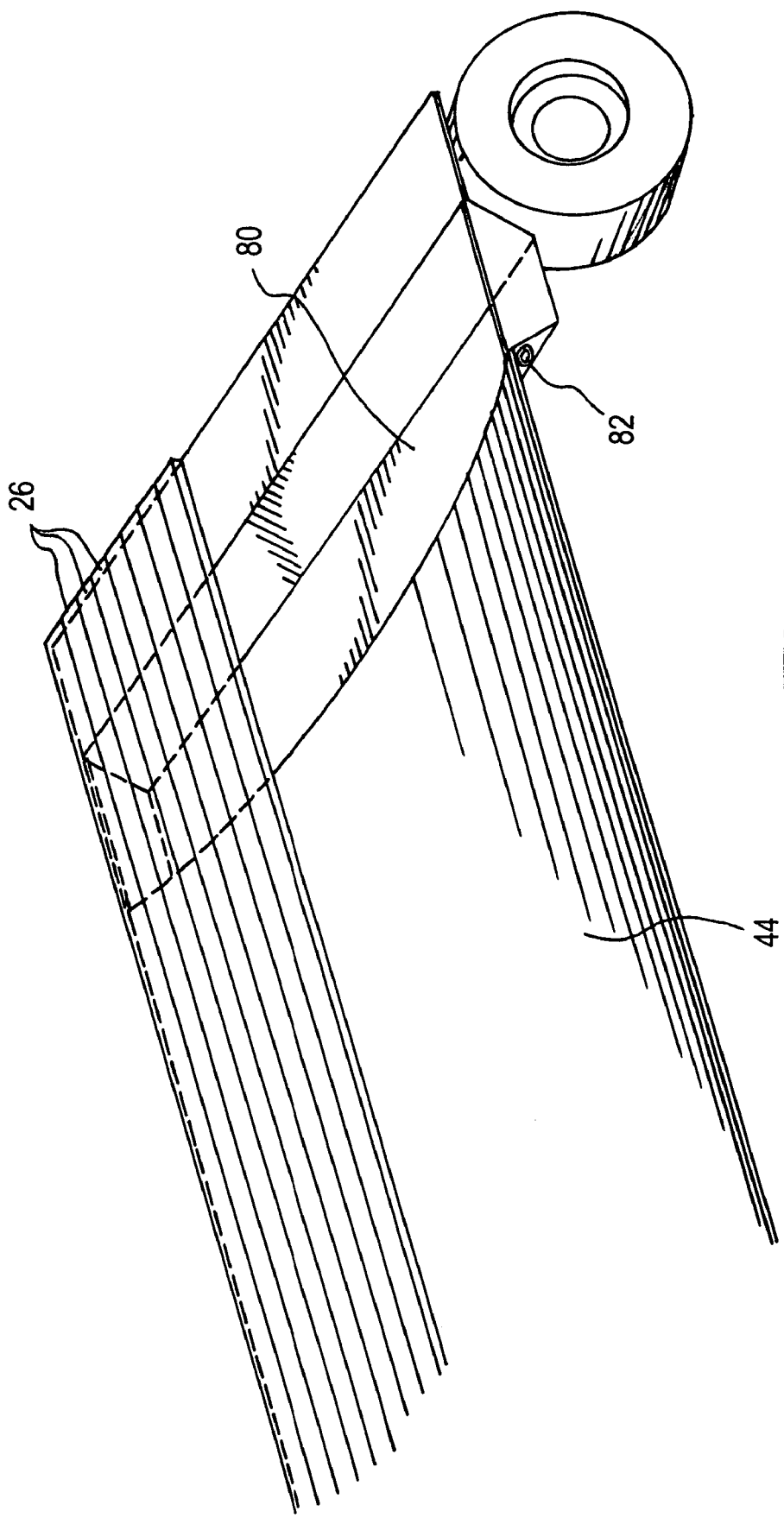
FIG. 5 is a perspective view of a portion of an alternative embodiment of the trailer with a front tray.

An alternative embodiment of the trailer 10, shown in FIG. 5, has a transverse tray 80 which is in communication with the extended tray 44 so that liquid collected in the tray 44 can flow into the tray 80. Preferably, the transverse tray 80 also spans the width of the trailer 10 but is deeper than the extended tray 44. Preferably, the transverse tray 80 is positioned near the drive means 60 but may be positioned anywhere along the length of the extended tray 44. The transverse tray 80 is equipped with a plug 82 to drain the transverse tray 80.

Figure 6:
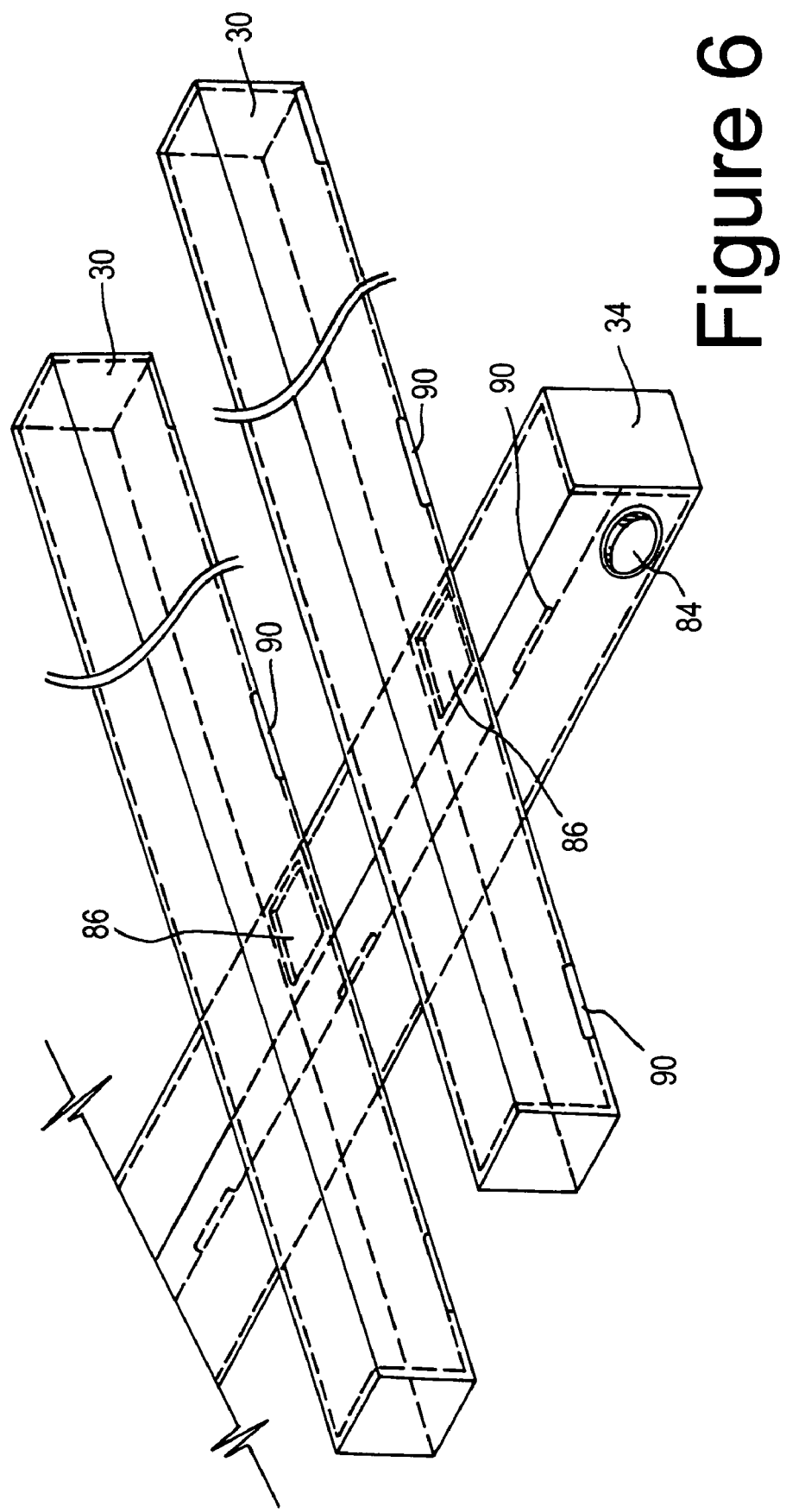
FIG. 6 is a perspective view taken from above of an alternative embodiment of a cross member and two slats wherein the cross member and two slates are hollow.

In a further embodiment of the trailer 10, shown in FIG. 6, the cross member 34 has a first aperture 84 and a series of second apertures 86 by which the cross member 34 is in communication with the slat-bearing bars 30. Both the cross member 34 and the slat-bearing bars 30 have slits 90.

In operation, wet refuse is deposited upon the platform 20. Liquid from the refuse seeps between the elongated slats 26 and collects in the extended tray 44. In the alternative embodiment with the transverse tray 80, extra liquid from within the extended tray 44 or from the platform 20 collects in the transverse tray 80.

Once the refuse has been collected and transported to its destination, the drive means 60 is engaged. The hydraulic cylinders 64, 66 and 68 extend and retract so as to move the cross drives 70, 72 and 74 and thus displace the elongated slats 26 upon the bearings 32 on the slat-bearing bars 30. The hydraulic cylinders may extend in tandem so as to move all of the elongated slats 26 at once between a first and a second position and thus displace refuse. Alternatively, the hydraulic cylinders may extend and retract sequentially so as to return the elongated slats to the first or the second position at different times and thereby not displace the refuse.

Finally, in the alternative embodiment in which the cross member 34 and the slat-bearing bars 30 have first aperture 84 and second apertures 86, respectively, water or a suitable cleaning fluid is sprayed through the first aperture 84 into the cross member 34 to clean it of any deposits left by the refuse. The water or cleaning fluid then flows into the slat-bearing bars 30 through the second apertures 86. The water or cleaning fluid flows through the slits 90 in the cross member 34 and in the slat-bearing bars 30 and collects in the extended tray 44.

Numerous modifications may be made to the embodiments described above without departing from the scope of the invention, which is defined by the claims.

I claim:

1. A refuse collection system for use in combination with a transport vehicle, said system comprising:
    a refuse container for said transport vehicle, said container having a length and including two lengthwise extending side walls, a front wall, a rear door, and a bottom with a frame having at least two cross members and at least two slat-bearing bars extending across and mounted on said cross members;
    a platform attached to and mounted on the frame and having at least two elongated slats each engaged with one of the at least two slat-bearing bars such that the at least two elongated slats are spaced apart from one another so as to permit liquid refuse to seep between and through the at least two elongated slats;
    a drive means attached to the at least two elongated slats so as to move them between a first position and a second position in a lengthwise direction relative to the slats, the drive means situated distal from the platform out of the path of the liquid refuse; and
    an elongate tray extending in a lengthwise direction relative to said container, attached to the frames and situated beneath the platform and said at least two slat-bearing bars so as to catch the liquid refuse that seeps between and through the at least two elongated slats.

2. A refuse collection system according to claim 1 wherein said tray extends beneath most of the length of said platform and said slat-bearing bars.

3. A refuse collection system according to claim 2 wherein said tray is attached to said cross members near each of said side walls of the container and is sealed.

4. A refuse collection system according to claim 2 wherein said tray is convex-shaped in transverse cross-section with the convex side facing downwards.

5. A refuse collection system according to claim 2 wherein said tray is sloped from an end of the tray proximate to said front wall to an opposite end of the tray proximate to said rear door and is sealed.

6. A refuse collection system according to claim 1 wherein said tray forms a structural component of the refuse collection system with said tray supporting said frame and the platform mounted on the frame.

7. A refuse collection system according to claim 6 wherein said tray is constructed as a single integral component and extends beneath most of the length of said platform and said slat-bearing bars.

8. A refuse collection system according to claim 6 wherein said tray has a bottom surface and said system includes a vehicle chassis attached to the bottom surface of said tray and wheel axles for said transport vehicle attached to said chassis.

9. A refuse collection system according to claim 2 wherein said drive means includes hydraulic cylinder drives each of which extends through an opening in said front wall of the container and cross drives each of which is connected to a respective one of said hydraulic cylinder drives and wherein each cross drive is connected to its respective elongated slats of the platform.

10. A refuse collection system according to claim 3 wherein each slat-bearing bar has a bearing attached to the bar and each elongated slat engages and slides upon a respective one of the bearings.

11. A transport trailer comprising:
    a trailer unit for a transport vehicle, said trailer unit including a transport container having a length and including two lengthwise-extending side walls, a front wall, a rear door, and a bottom, said bottom being formed by a frame constructed of cross members and slat-mounting bars extending across and mounted on said cross members;
    a plurality of elongate slats extending lengthwise in said trailer unit and mounted on said slat-mounting bars for lengthwise reciprocation, adjacent slats being spaced apart from one another so as to permit liquid to seep between and through the slats and the slat-mounting bars;
    drive means attached to the slats for reciprocating them between first and second positions, said drive means being mounted on the trailer unit; and
    an elongate tray extending in the lengthwise direction relative to said container, attached to said frame, situated beneath said slats and said frame, and adapted to catch said liquid that seeps between and through the slats and the slat-mounting bars.

12. A transport trailer according to claim 11 wherein said tray extends beneath most of the length of the elongated slats and said slat-mounting bars.

13. A transport trailer according to claim 12 wherein said tray is attached to said cross members near each of said side walls of the container, is sealed, and is a structural component of said transport trailer with the tray supporting the frame forming the bottom of the container.

14. A transport trailer according to claim 11 wherein said tray is convex-shaped in transverse cross-section with the convex side facing downwards.

15. A transport trailer according to claim 12 wherein said tray slopes downwards from an end of the tray proximate said front wall to an opposite end of the tray proximate to said rear door and is sealed.

16. A transport trailer according to claim 11 wherein said slat-mounting bars are spaced apart from each other and are mounted directly to said cross members.

17. A transport trailer according to claim 12 wherein said drive means is situated distal from the elongated slats out of the path of any liquid seeping between and through the slats.

18. A transport trailer according to claim 12 wherein a further, transverse tray is provided, this tray being deeper than said elongate tray and communicating with said elongate tray so that liquid collected in the elongate tray can flow into said transverse tray.

19. A transport trailer according to claim 12 wherein said drive means comprises hydraulic cylinder devices situated outside of the trailer unit, each cylinder device extending through an opening in said front wall of the transport container and being connected to a respective cross drive which in turn is connected to a portion of the elongated slats.

20. A transport trailer according to claim 12 wherein said adjacent slats are spaced apart a distance ranging between $1/64^{th}$ inch and 3 inches.

21. A transport vehicle comprising:
a wheeled vehicle unit including a transport container having a length, two lengthwise-extending side walls, a front wall, a rear door, and a bottom, said bottom being constructed with transversely extending frame members and being adapted to support a reciprocating slat-type conveyor mounted on top of said frame member during use of the vehicle; and
an elongate tray extending in the lengthwise direction relative to said container, attached to said bottom beneath said frame members, and adapted to catch liquid from the contents of said container that can seep through said conveyor and between the frame members during use of the vehicle with said slat-type conveyor,
wherein said tray extends beneath most of the length of said transport container.

22. A transport vehicle according to claim 21 wherein said tray is attached to said cross members near each of said side walls, is sealed, and is a structural component of said vehicle unit with the tray supporting said frame members.

23. A transport vehicle according to claim 21 wherein said tray is convex-shaped in transverse cross-section with the convex side thereof facing downwards.

24. A transport vehicle according to claim 23 wherein said tray slopes downwards from an end of the tray proximate said front wall to an opposite end of the tray proximate to said rear door and is sealed.

25. A transport vehicle according to claim 21 including slat-mounting bars extending across and mounted on said frame members, wherein said frame members and said bars are hollow, are each formed with an aperture for introduction of water or a cleaning fluid, and are formed with outlet openings for water or cleaning fluid to pass from the frame members and bars and into the tray.

* * * * *